United States Patent
Fleszewski et al.

(10) Patent No.: US 10,859,235 B2
(45) Date of Patent: Dec. 8, 2020

(54) WARNING DEVICES WITH OSCILLATING LIGHT PATTERNS

(71) Applicant: Federal Signal Corporation, Oak Brook, IL (US)

(72) Inventors: Vincent S. Fleszewski, Crown Point, IN (US); Robert A. Czajkowski, Tinley Park, IL (US); Robert R. March, Jr., Plainfield, IL (US); Allan Mostello, Crown Point, IN (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 15/608,019

(22) Filed: May 30, 2017

(65) Prior Publication Data

US 2017/0350573 A1  Dec. 7, 2017

Related U.S. Application Data

(60) Provisional application No. 62/344,693, filed on Jun. 2, 2016.

(51) Int. Cl.
*F21V 5/00* (2018.01)
*F21V 5/08* (2006.01)
(Continued)

(52) U.S. Cl.
CPC ............... *F21V 5/007* (2013.01); *B60Q 1/52* (2013.01); *F21V 5/008* (2013.01); *F21V 5/02* (2013.01); *F21V 5/04* (2013.01); *F21V 5/08* (2013.01); *F21V 7/0016* (2013.01); *F21V 7/0083* (2013.01); *F21V 7/041* (2013.01);
(Continued)

(58) Field of Classification Search
CPC ...... F21V 7/0083; F21V 13/04; F21V 13/045; F21V 13/06; F21V 13/12; F21V 9/35; F21V 5/007; F21V 5/008; G08B 5/38; B60Q 1/52
See application file for complete search history.

(56) References Cited

U.S. PATENT DOCUMENTS

| 1,991,101 A | 2/1935 | Jeremiah |
| 2,132,392 A | 10/1938 | Chalker |
(Continued)

FOREIGN PATENT DOCUMENTS

| DE | 102009060566 A1 * | 6/2011 | ............. F21V 5/008 |
| DE | 102010014289 A1 * | 10/2011 | ............. F21V 5/008 |
(Continued)

OTHER PUBLICATIONS

Search Report for European Patent Application No. 17174099.6, dated Oct. 6, 2017, 8 pages.
(Continued)

*Primary Examiner* — Alexander K Garlen
*Assistant Examiner* — Colin J Cattanach
(74) *Attorney, Agent, or Firm* — Merchant & Gould P.C.

(57) ABSTRACT

An example warning device can include: a plurality of light sources forming an array; a plurality of reflectors, with at least one reflector being associated with each of the plurality of lights; at least one lens for each of the plurality of lights; and an optical prism plate that directs light from one or more of the plurality of lights to one of a plurality of far field light spots.

16 Claims, 7 Drawing Sheets

(51) Int. Cl.

| | |
|---|---|
| *F21V 5/02* | (2006.01) |
| *H05B 47/10* | (2020.01) |
| *B60Q 1/52* | (2006.01) |
| *F21V 5/04* | (2006.01) |
| *F21V 7/00* | (2006.01) |
| *F21V 7/04* | (2006.01) |
| *G08B 5/38* | (2006.01) |
| *F21W 111/00* | (2006.01) |
| *F21V 13/04* | (2006.01) |
| *F21Y 105/00* | (2016.01) |
| *F21Y 115/10* | (2016.01) |
| *B60Q 1/26* | (2006.01) |
| *B60Q 1/00* | (2006.01) |
| *B60Q 1/28* | (2006.01) |

(52) U.S. Cl.
CPC .............. *G08B 5/38* (2013.01); *H05B 47/10* (2020.01); *B60Q 1/0041* (2013.01); *B60Q 1/26* (2013.01); *B60Q 1/2603* (2013.01); *B60Q 1/2607* (2013.01); *B60Q 1/268* (2013.01); *B60Q 1/2611* (2013.01); *B60Q 1/2615* (2013.01); *B60Q 1/2619* (2013.01); *B60Q 1/28* (2013.01); *F21V 13/04* (2013.01); *F21W 2111/00* (2013.01); *F21Y 2105/00* (2013.01); *F21Y 2115/10* (2016.08)

(56) References Cited

U.S. PATENT DOCUMENTS

| | | | |
|---|---|---|---|
| 2,677,121 A | 4/1954 | Heehler | |
| 3,908,179 A | 9/1975 | Heehler et al. | |
| 4,733,335 A * | 3/1988 | Serizawa | B60Q 1/302 362/503 |
| 5,490,049 A * | 2/1996 | Montalan | B60Q 1/2696 362/240 |
| 5,580,156 A * | 12/1996 | Suzuki | B60Q 7/00 116/63 P |
| 6,283,613 B1 * | 9/2001 | Schaffer | F21V 7/0083 116/63 R |
| 6,554,451 B1 * | 4/2003 | Keuper | F21V 5/007 362/237 |
| 8,047,676 B2 * | 11/2011 | Cheng | F21V 5/002 362/240 |
| 2004/0208018 A1 * | 10/2004 | Sayers | F21V 5/045 362/544 |
| 2007/0097700 A1 * | 5/2007 | Pederson | B60Q 1/2611 362/555 |
| 2010/0039812 A1 * | 2/2010 | Cheng | F21V 5/002 362/241 |
| 2010/0157589 A1 * | 6/2010 | Czajkowski | B60Q 1/2611 362/234 |
| 2010/0195330 A1 * | 8/2010 | Schaefer | F21S 8/085 362/237 |
| 2011/0012746 A1 * | 1/2011 | Fish, Jr. | G08B 5/38 340/691.6 |
| 2012/0092863 A1 * | 4/2012 | Krijn | F21S 10/00 362/231 |
| 2012/0230044 A1 * | 9/2012 | Zhang | F21K 9/69 362/487 |
| 2012/0281418 A1 * | 11/2012 | Eckert | F21V 7/0083 362/306 |
| 2012/0319871 A1 * | 12/2012 | Wise | B64F 1/20 340/961 |
| 2014/0268845 A1 * | 9/2014 | Davis | B60Q 1/2661 362/492 |
| 2014/0299897 A1 * | 10/2014 | Zhang | F21K 9/60 257/88 |
| 2015/0062917 A1 * | 3/2015 | Yin | F21V 13/04 362/309 |
| 2017/0116864 A1 * | 4/2017 | Zarnowski | F21V 29/70 |
| 2019/0069677 A1 * | 3/2019 | Scharer | A47B 97/00 |

FOREIGN PATENT DOCUMENTS

| | | |
|---|---|---|
| EP | 2199661 A2 | 6/2010 |
| EP | 2 995 852 A1 | 3/2016 |
| WO | 01/09859 A1 | 2/2001 |
| WO | 01/16524 A1 | 3/2001 |
| WO | WO-2010010494 A1 * | 1/2010 ......... G02B 19/0066 |
| WO | 2010/103477 A1 | 9/2010 |

OTHER PUBLICATIONS

Search Report for European Patent Application No. 17174099.6 dated Dec. 11, 2018, 4 pages.

Search Report for European Patent Application No. 17174099.6 dated Jun. 24, 2019, 5 pages.

* cited by examiner

WARNING DEVICES WITH OSCILLATING LIGHT PATTERNS

RELATED APPLICATION(S)

This patent application claims the benefit of U.S. Patent Application Ser. No. 62/344,693 filed on Jun. 2, 2016, the entirety of which is hereby incorporated by reference.

BACKGROUND

Warning devices that use mechanical mechanisms to produce oscillating light patterns have been used on emergency vehicles. While these types of warning devices can be effective, they are inherently expensive and their reliability suffers due to the mechanical components used to produce the oscillating motion.

Further, the mechanical linkages used to create the oscillating light patterns could be adjusted to produce different oscillating warning light patterns. The warning device would need to be taken out of service and disassembled to perform adjustments and create different warning patterns.

SUMMARY

In one example aspect, a warning device can include: a plurality of light sources forming an array; a plurality of reflectors, with at least one reflector being associated with each of the plurality of lights; at least one lens for each of the plurality of lights; and an optical prism plate that directs light from one or more of the plurality of lights to one of a plurality of far field light spots.

DETAILED DESCRIPTION

The present disclosure is directed to warning devices, such as those used on emergency vehicles, that create various light patterns without using mechanical mechanisms to do so.

In such examples, the warning device(s) can be typically located on the front of an emergency vehicle and produce the far field light spot pattern perpendicular to the direction of vehicle motion. In such an example, the 3 on-axis far field light spots (located on the H axis depicted in FIG. 1) would be in line with preceding vehicles in the lane the emergency in which the emergency vehicle is traveling in. They would provide a warning signal to these vehicles (through their rear view mirrors) that an emergency vehicle calling for the right of way was behind them. The other far field light spots (located on the axes 20° L, 10° L, 10° R, and 20° R depicted in FIG. 1) would, align with the vehicles in adjacent lanes of traffic and would provide a warning signal to these vehicles that an emergency vehicle was calling for the right of way. The intersection of each far field light spot and vehicle would depend on each vehicle's distance from the emergency vehicle and the distance between the lanes.

Embodiments described herein utilize light sources (such as light-emitting diodes (LEDs)), secondary optics, and control electronics to produce an array of light spots in the far field. The control electronics allow individual control of each light spot. Illuminating these spots in a predefined sequence allows for the creation of oscillating light patterns in the far field comparable to those produced by mechanical oscillating warning lights.

One advantage associated with these embodiments is that multiple oscillatory light patterns can be stored in memory and initiated as needed without the need for taking the warning device out of service. In this way, different oscillating patterns suitable for different circumstances can be available to the operator.

Figure 1:
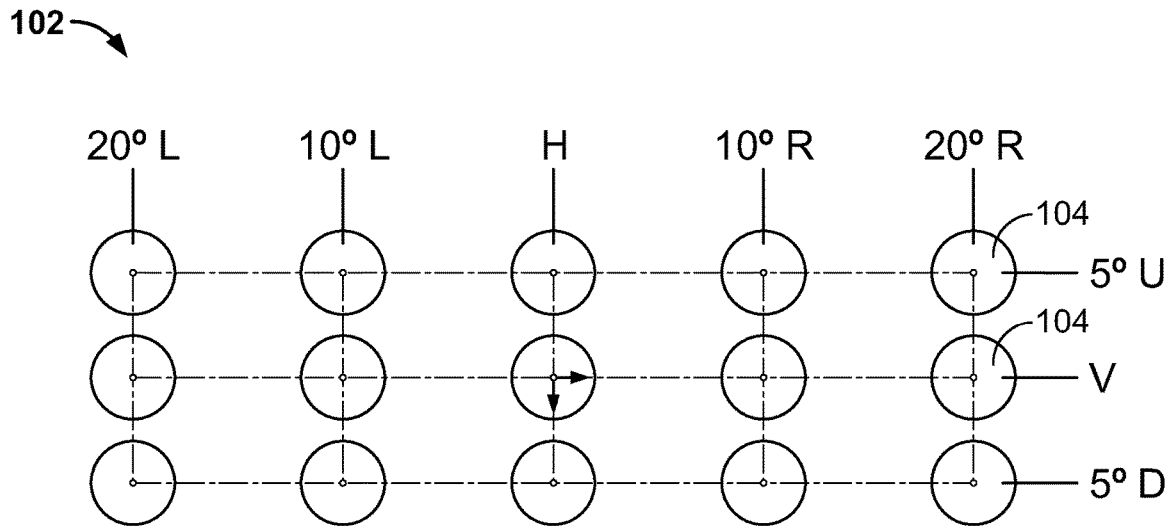
FIG. 1 is an example array of light spots in the far field.
Figure 2:
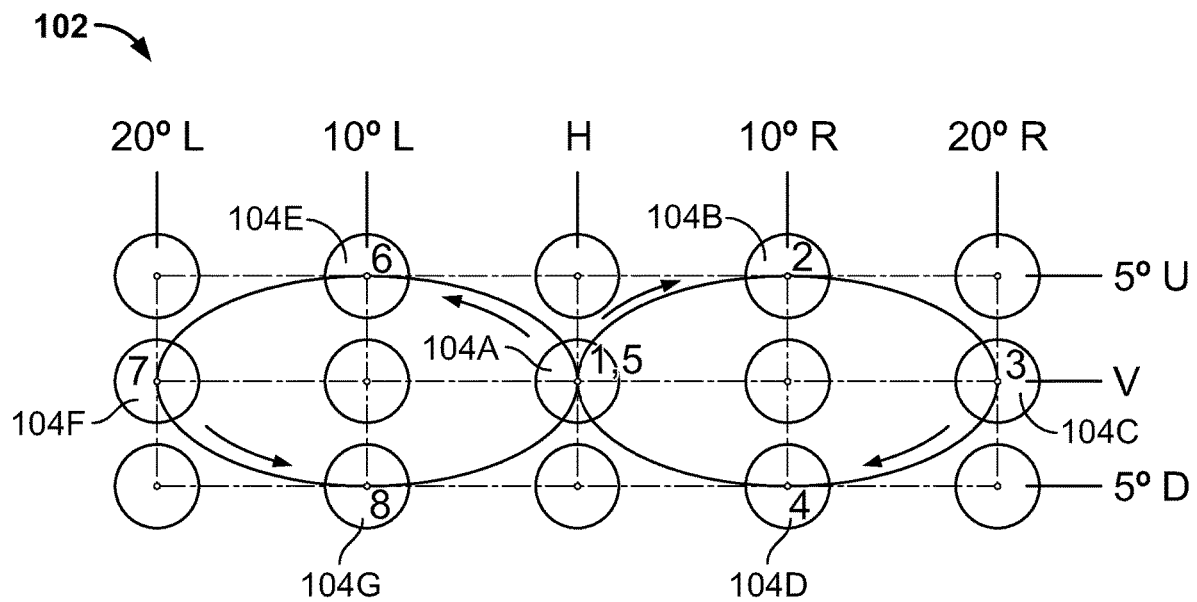
FIG. 2 is an example sequence of illumination of the array of light spots in FIG. 1 to create a figure "8" light pattern.
Figure 3:
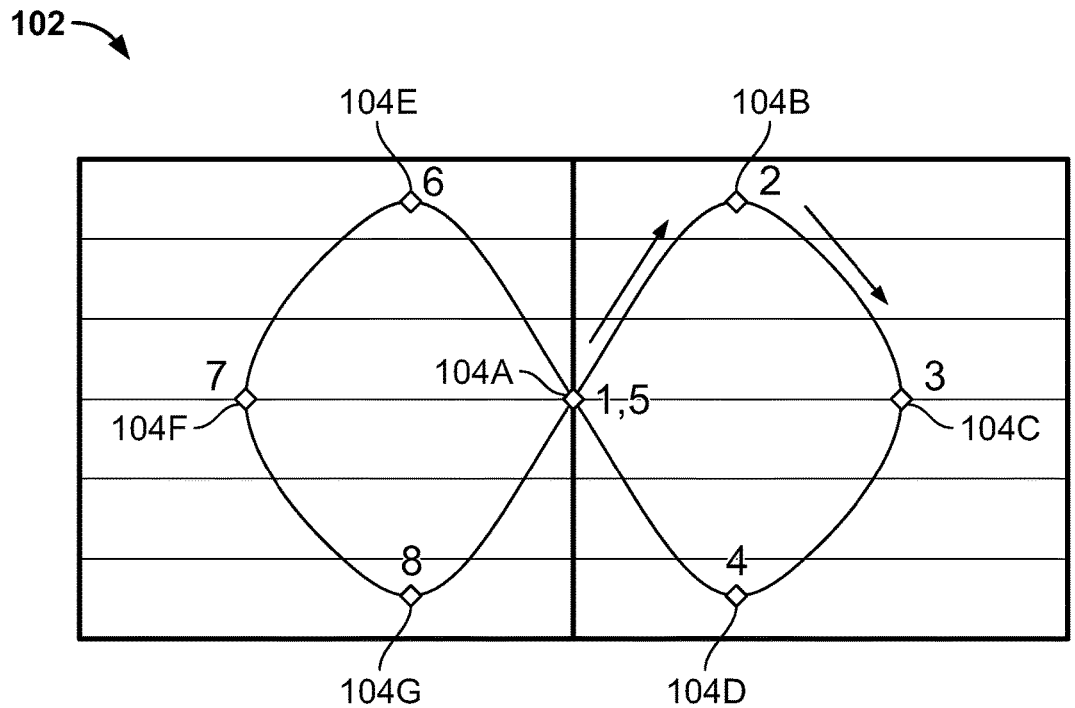
FIG. 3 is an example figure "8" light pattern as produced by the sequence of illumination of FIG. 2.

In one example, a plurality of light sources (such as Light-Emitting Diodes (LEDs)) and secondary optics are used to produce an array of light spots in the far field. In the embodiment described, an array 102 is composed of 15 spots or pixels 104, as depicted in FIG. 1. Each light spot 104 represents at least one light source, such as an LED.

The control electronics can individually control the state of each of these light spots 104, such as completely off, completely on, on with increasing intensity, on with decreasing intensity, etc. Sequencing, brightening, and dimming the state of each of these light spots 104 allows for the simulation of the far field lighting effect of an oscillating warning light.

FIGS. 2-5 illustrate some of the possible light patterns, such as a figure "8" pattern. For example, in FIGS. 2-3, a subset of 7 of the far-field spots 104A-104G are lit in the order indicated (e.g., 1, 2, 3, . . . 8) to create a figure "8" pattern in the far field. This pattern can be repeated in the order indicated: 104A, 104B, 104C, 104D, 104A, 104E, 104F, and 104G.

Figure 4:
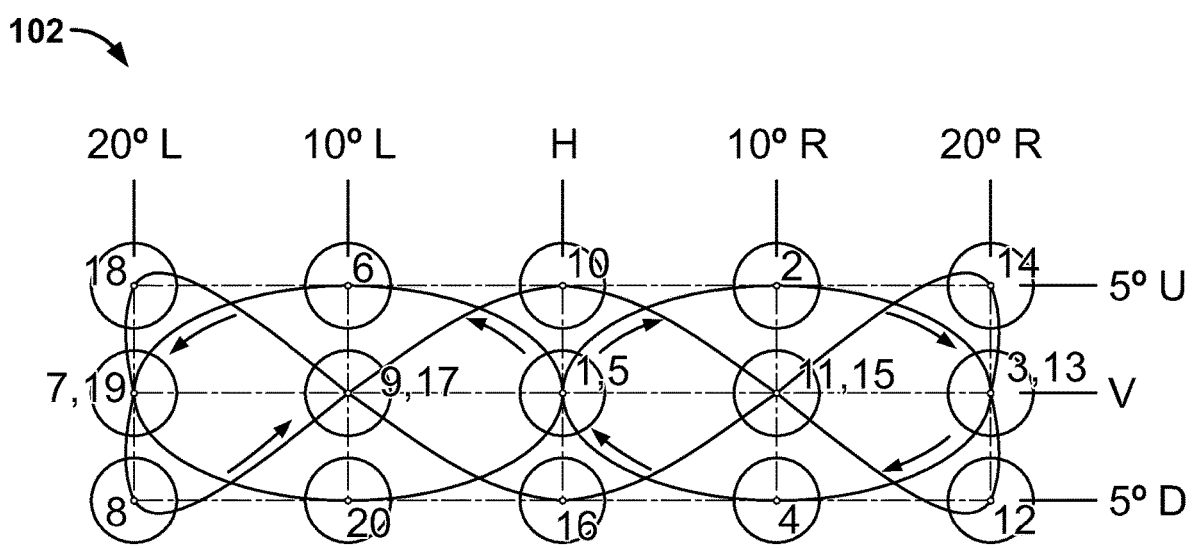
FIG. 4 is an example sequence of illumination of the array of light spots in FIG. 1 to create an oscillating light pattern.
Figure 5:
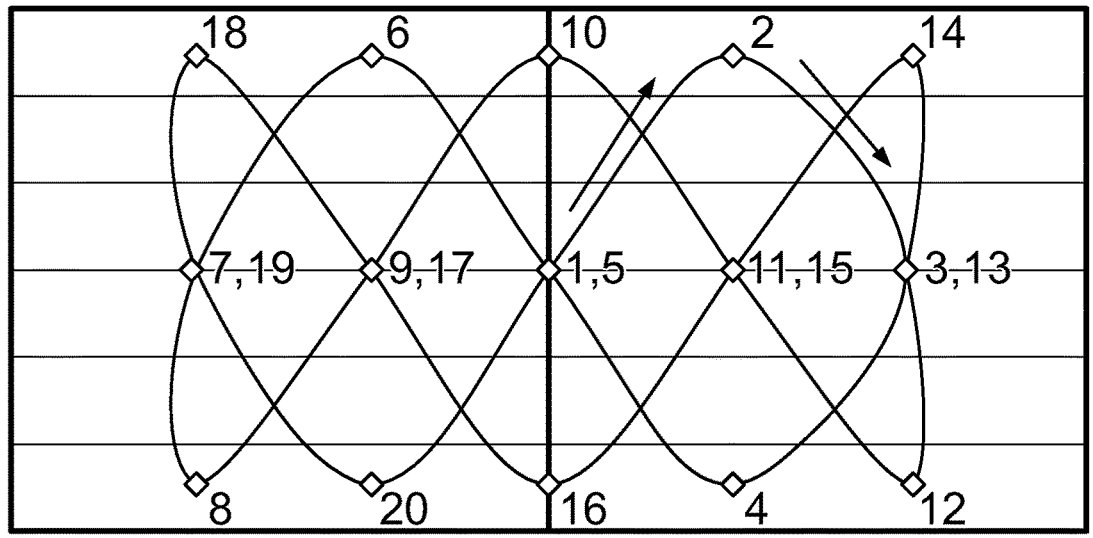
FIG. 5 is an example oscillating light pattern produced by the sequence of illumination of FIG. 4.

Likewise, in FIGS. 4-5, all 15 of the far-field spots 104 are lit in the noted order to create an oscillating pattern.

Figure 6:
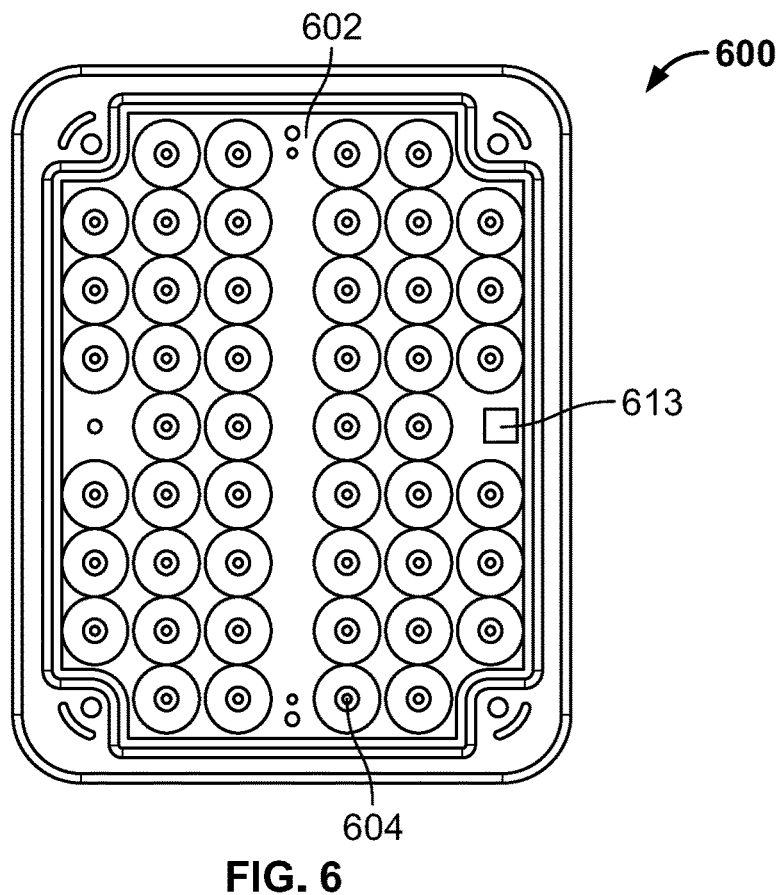
FIG. 6 is an example warning device including a rectangular array of light sources.
Figure 7:
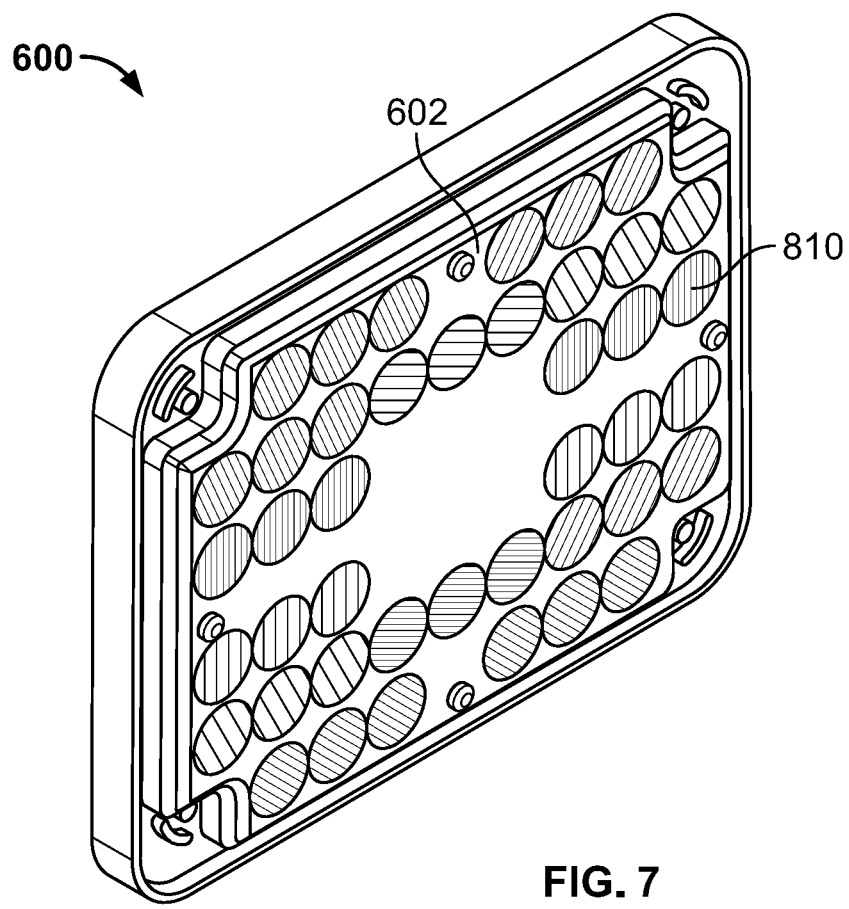
FIG. 7 is an isometric view of the rectangular array of FIG. 4 showing example prism orientations.
Figure 8:
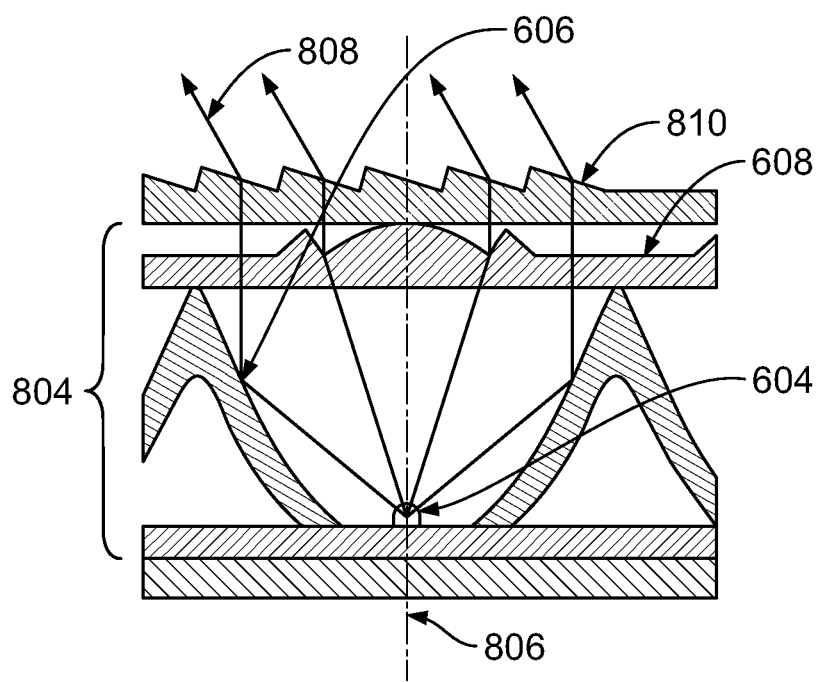
FIG. 8 is a cross section of an example cell of the rectangular array of FIG. 4.

As shown in FIGS. 6-8, a warning device 600 has an optical system 602 that is composed of a rectangular array of LEDs 604. Each LED 604 is surrounded by a reflector 606 and/or lens elements 608. The combination of the reflector 606 and/or lens elements 608 collimate the light from each LED 604 and direct it along the optical axis 806 of the LED 604. This results in effectively increasing the luminous intensity of each of the LED/Reflector/Lens (LRL) cells 804. Each LRL cell 804 then passes through an optical prism plate 810, which directs the light 808 to one of the 15 far field light spots. While the prism plate 810 is depicted as a separate component, its function could be incorporated into either the reflector element 606, lens element 608, or both. See, e.g., FIG. 9, described below.

In this embodiment, the light output of three LRL cells 804 are directed to each of the 15 far field light spots. Alternatively, either more (4, 5, etc.) or less (1 or 2) LRL cells 804 could be directed to each of the 15 far field light spots. For example, in this embodiment, the H-V pixel (i.e., the middle six lights without associated prism elements) which is directly forward of the device has 6 LRL cells directed toward it. This is distinct from the embodiment shown in FIGS. 9 and 10, which only utilize 1 LRL cell per far field light spot. The embodiment depicted in FIG. 12 uses 2 LRL cells per far field light spot. The number of LRL cells per far field light spot is dependent on the available physical space and the desired intensity of the far field light spot.

A controller 613 of the warning device 600 includes control electronics that are programmed to control illumination of each LED 604 to provide a desired effect (e.g., oscillations).

The preceding description is of one embodiment. Other embodiments are possible.

Figure 9:
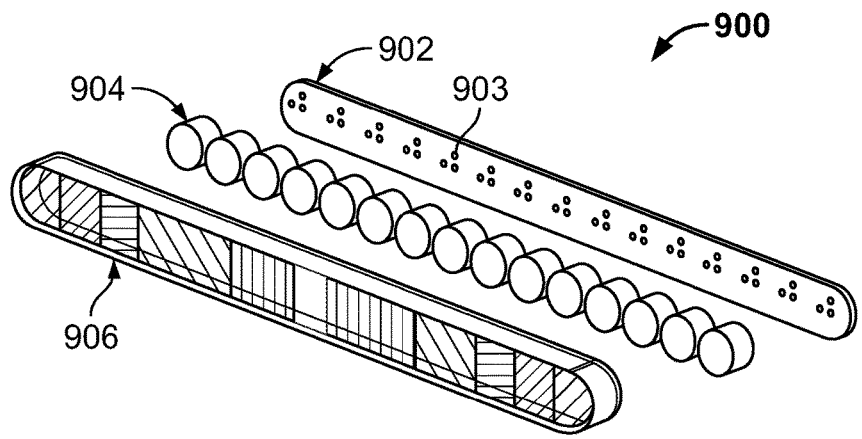
FIG. 9 is another example warning device including a linear array of light sources.

For example, as depicted in FIG. 9, the dimensions of the LED array could be changed so that the warning light 900 would be suitable for mounting in a warning light bar or installed into a housing to make a stand-alone warning device. In this example, the warning light 900 includes a printed circuit board 902 with LED sources 903 positioned thereon. In this example, the LED sources 903 are grouped into threes. An array of collimating optics 904 is provided, along with an outer lens 906. In this example, the outer lens 906 includes integral prism plate optics.

Figure 10:
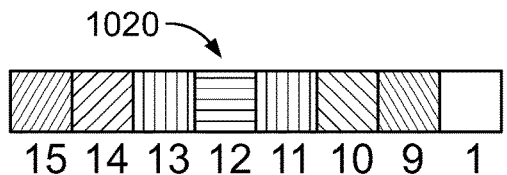
FIG. 10 is another example warning device including two linear arrays of light sources.
Figure 10:
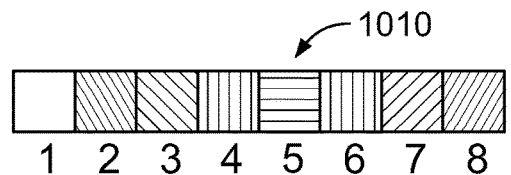
Figure 11:
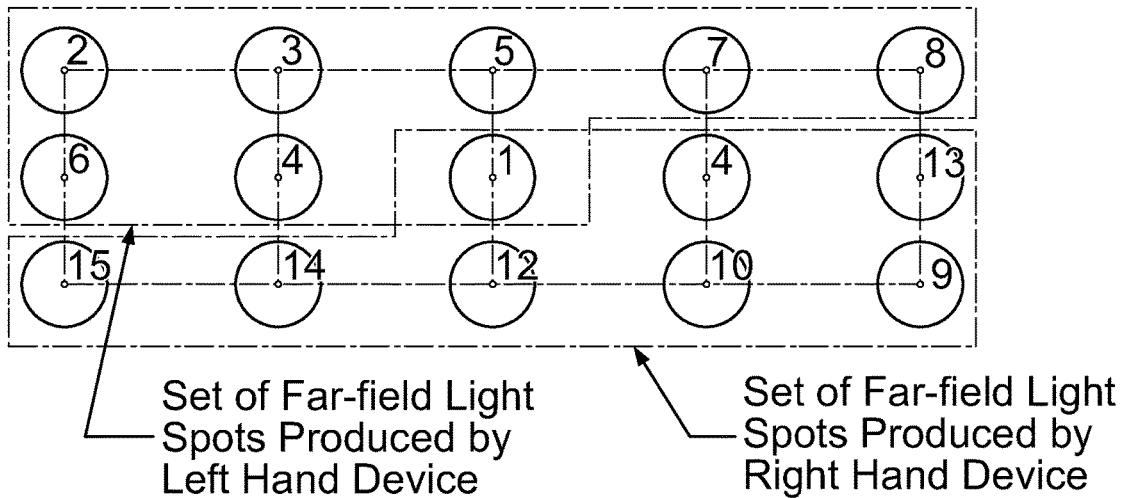
FIG. 11 is an example array of light spots in the far field from the warning device of FIG. 10.

A warning light 1000 that includes splitting the single array into two arrays 1010, 1020 is depicted in FIG. 10. In this embodiment, 2 instances of the same device containing an 8×1 array of LRL cells can be used to produce the 15 element far-field light spot array 1100 previously described and shown in FIG. 11. The first device 1010 (the right hand device shown in FIG. 10) produces the 8 far-field light spots located at the center, left of center, and upper level of the far field pattern 1100. By inverting the second device 1020, it will produce the 8 far-field light spots located at the center, right of center, and lower level of the far field pattern 1100. Splitting the warning light 1000 in this way allows two of the same part to be used to produce the far field pattern, which is a manufacturing advantage. FIGS. 10-11 depict how the LRL cells in each device 1010, 1020 are mapped into the far field 15 light spot array 1100.

Figure 12:
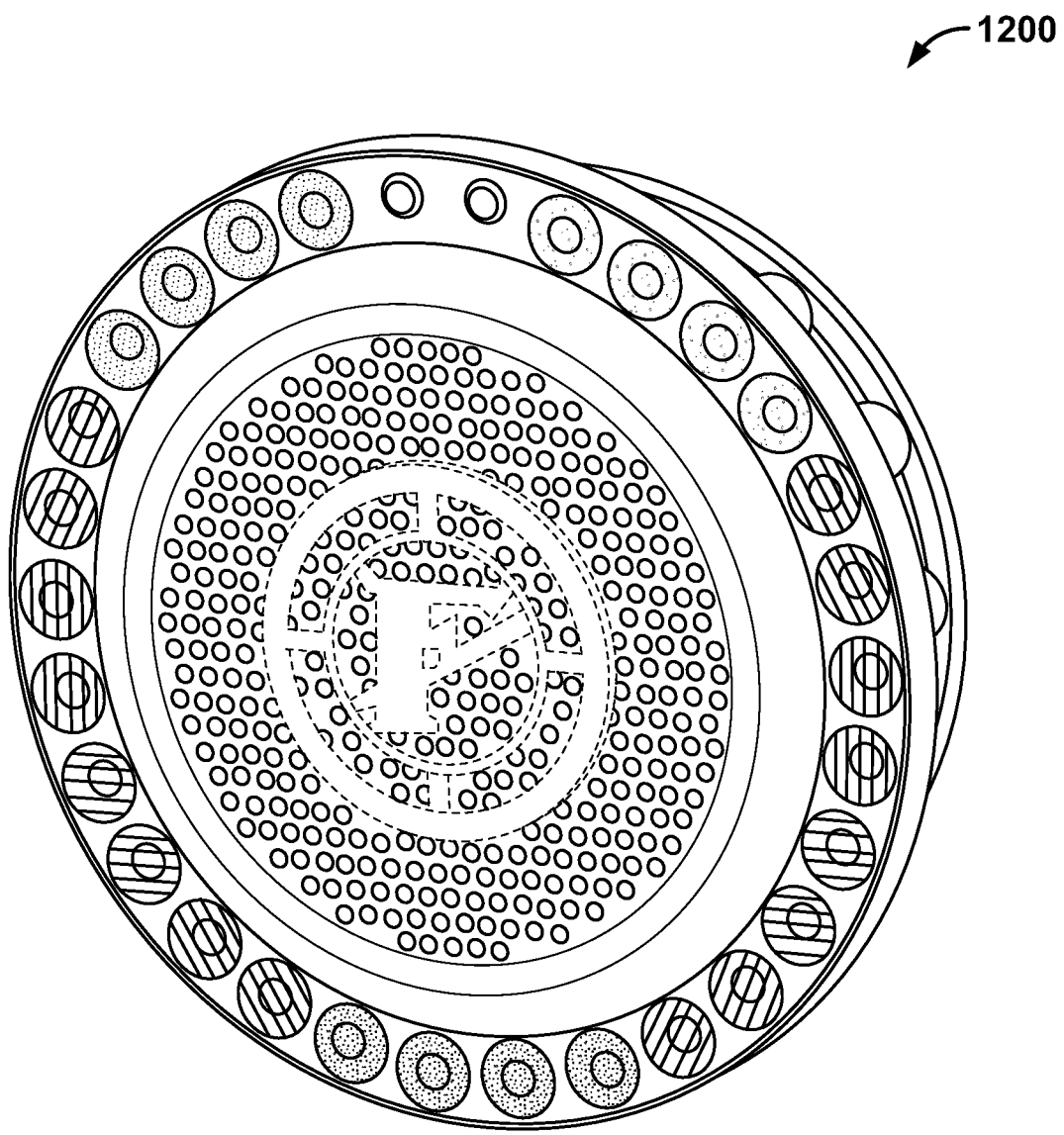
FIG. 12 is another example warning device including a circular array of light sources.
Figure 13:
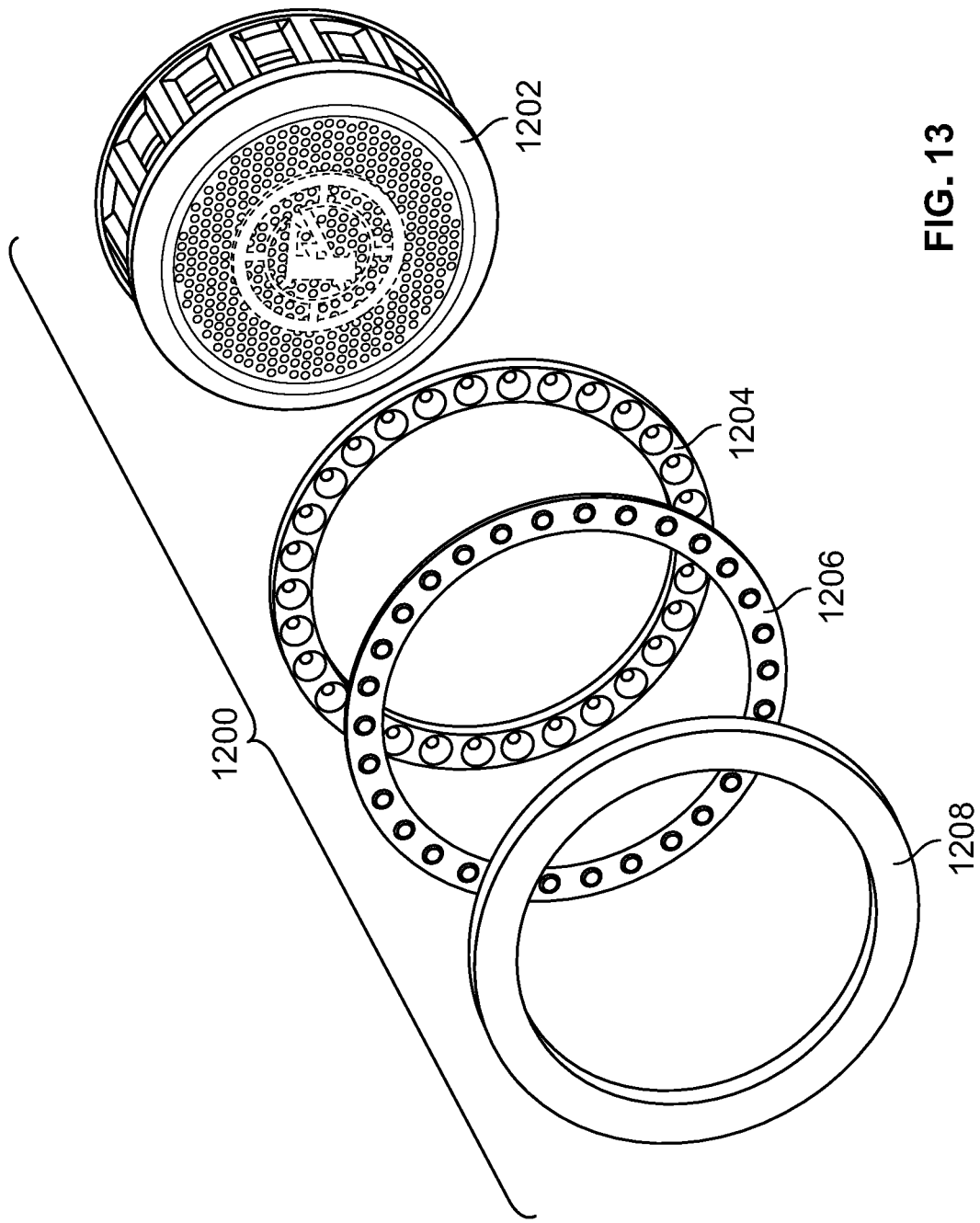
FIG. 13 is an exploded view of the warning device of FIG. 12.

Another variation of a warning device 1200 is depicted in FIGS. 12-13. In this embodiment, the LRL cells include a reflector ring 1204 are positioned in a circular array instead of rectangular array. When configured in a circular array, the reflector ring 1204 can surround a siren 1202 (such as the Federal Signal Q-Siren) that emits an emergency sound or other type of warning device resulting in a multi-function device. In the example depicted, the reflector ring 1204 is configured with LEDs positioned about the circular array, and a lens ring 1206 and a prism plate ring 1208 are positioned to form the warning device 1200 shown in FIG. 12.

In the examples provided herein, the warning devices are computing devices. The computing device can include a controller having at least one central processing unit ("CPU"), a system memory, and a system bus that couples the system memory to the CPU. The system memory includes a random access memory ("RAM") and a read-only memory ("ROM"). The computing devices can further include a mass storage device. The mass storage device is able to store software instructions and data. One or more of these memories can be used to store one or more oscillating light patterns.

The mass storage device and its associated computer-readable data storage media provide non-volatile, non-transitory storage for the computing devices. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing devices.

According to various embodiments, the warning device may operate in a networked environment using logical connections to remote network devices through a network, such as a wireless network, the Internet, or another type of network. The computing devices may also include an input/output controller for receiving and processing input from a number of other devices, including a touch user interface display screen, or another type of input device. Similarly, the input/output controller may provide output to a touch user interface display screen or other type of output device.

As mentioned, the mass storage device and the RAM of the computing devices can store software instructions and data. The software instructions include an operating system suitable for controlling the operation of the computing devices. The mass storage device and/or the RAM also store software instructions, that when executed by the CPU, cause the computing devices to provide the functionality of the controller discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A warning device for an emergency vehicle, comprising:
a plurality of light sources forming an array to be positioned on the emergency vehicle, each of the plurality of light sources defining an optical axis, each optical axis of the light sources being perpendicular to a plane defined by the warning device, the array of light sources being configured to generate a far field array of light spots including at least three rows parallel to a horizontal axis of the array of light spots and each including at least five of the light spots, and at least five columns parallel to a vertical axis of the array of light spots each including at least three of the light spots, wherein:

each of the rows includes a row central light spot, a first right light spot to the right of the row central light spot, a second right light spot to a right of the first right light spot, a first left light spot to a left of the central light spot, and a second left light spot to a left of the first left light spot, the first right light spot being angularly offset from the row central light spot by a first right angular offset magnitude such that the first right light spot intersects with a first right lane of traffic to a right of a traveling lane of traffic in which the emergency vehicle is traveling, the second right light spot being angularly offset from the row central light spot by a second right angular offset magnitude such that the second right light spot intersects a second right lane of traffic to a right of the first right lane of traffic, the first left light spot being angularly offset from the row central light spot by a first left angular offset magnitude such that the first left light spot intersects a first left lane of traffic to a left of the traveling lane, the second left light spot being angularly offset from the row central light spot by a second left angular offset magnitude such that the second left light spot intersects a second left lane of traffic to a left of the first left lane of traffic, and each of the columns includes a column central light spot, a first column light spot above the column central light spot, and a second column light spot below the column central light spot, the first column light spot being angularly offset from the column central light spot by a first column offset magnitude, the second column light spot being angularly offset from the column central light spot by a second column offset magnitude that is equal to the first column offset magnitude;

a plurality of reflectors, with at least one reflector being associated with each of the plurality of light sources, and with each reflector of the plurality of reflectors defining a space within a wall forming each reflector;

at least one lens for each of the plurality of light sources, an entirety of the one lens being positioned outside of the space defined by the wall of each reflector; and an optical prism plate including at least:
  i) a first discrete prism element having a first configuration of prism edges arranged parallel to one another and positioned with respect to a first of the plurality of light sources to direct light from the first of the plurality of lights sources to a first of the light spots, the first configuration of prism edges being oriented relative to the plane in a first orientation; and
  ii) a second discrete prism element spaced apart from the first discrete prism element and having a second configuration of prism edges arranged parallel to one another and positioned with respect to a second of the plurality of light sources to direct light from the second of the plurality of light sources to a second of the light spots, the second configuration of prism edges being oriented relative to the plane in a second orientation, the second orientation being different from the first orientation.

2. The warning device of claim 1, wherein the plurality of reflectors is oriented to direct light from one of the plurality of light sources to one of the light spots.

3. The warning device of claim 1, with the plurality of lenses being configured to direct light from one or more of the plurality of light sources to one of the light spots.

4. The warning device of claim 1, wherein each of the plurality of reflectors and respective lens forms a reflector-lens combination, the reflector-lens combination being oriented to direct light from one of the plurality of light sources to one of the light spots.

5. The warning device of claim 1, wherein each of the plurality of light sources is a light-emitting diode.

6. The warning device of claim 1, wherein the array of light sources is linear.

7. The warning device of claim 1, wherein the array of light sources is circular.

8. The warning device of claim 1, wherein the array of light sources is split into two separate arrays, with each of the arrays including at least two of the plurality of light sources.

9. The warning device of claim 8, wherein each of the two separate arrays includes half of the plurality of light sources.

10. The warning device of claim 1, further comprising a controller, wherein the controller is programmed to control illumination of each of the plurality of light sources to produce a pattern.

11. The warning device of claim 10, wherein the pattern is a figure eight pattern or an oscillating pattern.

12. The warning device of claim 1, further comprising a siren configured to emit an emergency sound.

13. A warning device for an emergency vehicle, comprising:
  a plurality of light sources forming an array to be positioned on the emergency vehicle, each of the plurality of light sources defining an optical axis, each optical axis of the light sources being perpendicular to a plane defined by the warning device, the array of light sources being configured to generate a far field array of light spots including at least three rows parallel to a horizontal axis of the array of light spots and each including at least five of the light spots, and at least five columns parallel to a vertical axis of the array of light spots each including at least three of the light spots, wherein:
    each of the rows includes a row central light spot, a first right light spot to the right of the row central light spot, a second right light spot to a right of the first right light spot, a first left light spot to a left of the central light spot, and a second left light spot to a left of the first left light spot, the first right light spot being angularly offset from the row central light spot by a first right angular offset magnitude such that the first right light spot intersects with a first right lane of traffic to a right of a traveling lane of traffic in which the emergency vehicle is traveling, the second right light spot being angularly offset from the row central light spot by a second right angular offset magnitude such that the second right light spot intersects a second right lane of traffic to a right of the first right lane of traffic, the first left light spot being angularly offset from the row central light spot by a first left angular offset magnitude such that the first left light spot intersects a first left lane of traffic to a left of the traveling lane, the second left light spot being angularly offset from the row central light spot by a second left angular offset magnitude such that the second left light spot intersects a second left lane of traffic to a left of the first left lane of traffic, and
    each of the columns includes a column central light spot, a first column light spot above the column central light spot, and a second column light spot below the column central light spot, the first column light spot being angularly offset from the column central light spot by a first column offset magnitude, the second column light spot being angularly offset from the column central light spot by a second column offset magnitude that is equal to the first column offset magnitude;

a reflector for each of the plurality of light sources, the reflector defining a space within a wall forming each reflector;

at least one lens for each of the plurality of light sources, an entirety of the one lens being positioned outside of the space defined by the wall of the reflector; and an optical prism plate including at least:
  i) a first discrete prism element having a first configuration of prism edges arranged parallel to one another and positioned with respect to a first of the plurality of light sources to direct light from the first of the plurality of lights sources to a first of the light spots, the first configuration of prism edges being oriented relative to the plane in a first orientation; and ii) a second discrete prism element spaced apart from the first discrete prism element and having a second configuration of prism edges arranged parallel to one another and positioned with respect to a second of the plurality of light sources to direct light from the second of the plurality of light sources to a second of the light spots, the second configuration of prism edges being oriented relative to the plane in a second orientation, the second orientation being different from the first orientation.

14. The warning device of claim 13, wherein the reflector is oriented to direct light from one of the plurality of light sources to one of the light spots.

15. The warning device of claim 13, wherein the reflector and respective lens forms a reflector-lens combination, the reflector-lens combination being oriented to direct light from one of the plurality of light sources to one of the light spots.

16. The warning device of claim 13, with at least one lens of the plurality of lenses being associated with each of the plurality of light sources, and the plurality of lenses being configured to direct light from one or more of the plurality of light sources to one of the light spots.

* * * * *